May 23, 1944.   S. D. LAVOIE   2,349,440
WAVE METER
Filed Sept. 24, 1941    3 Sheets-Sheet 1
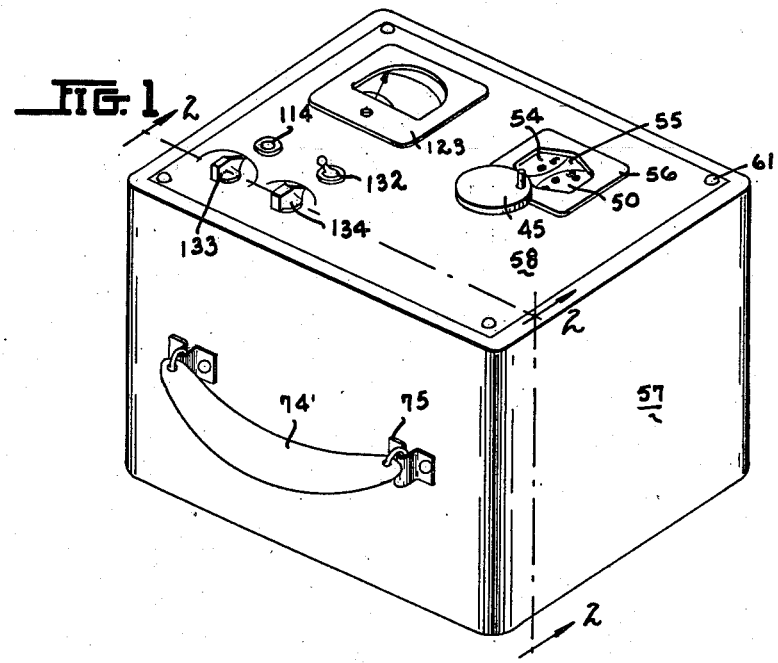
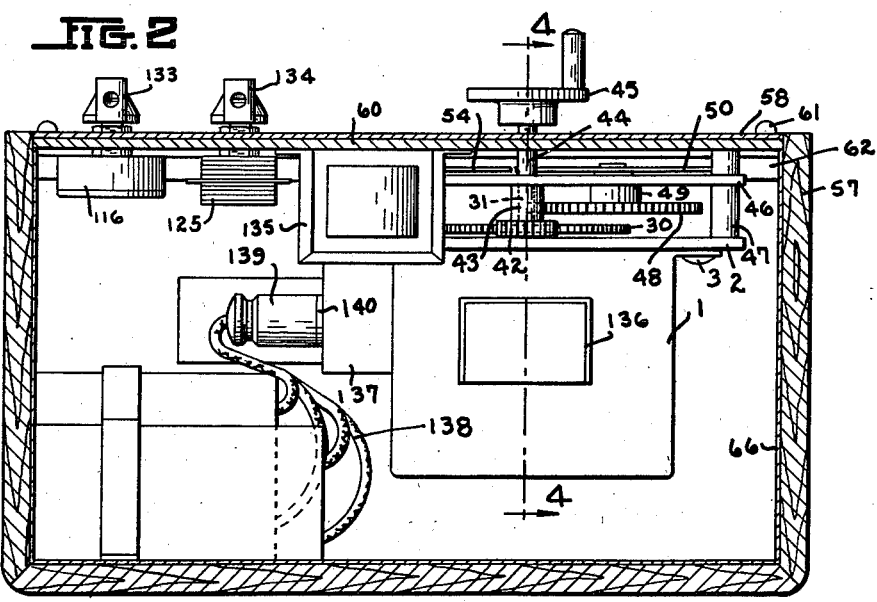
INVENTOR
STEPHEN D. LAVOIE
ATTORNEYS May 23, 1944.    S. D. LAVOIE    2,349,440
WAVE METER
Filed Sept. 24, 1941    3 Sheets-Sheet 2
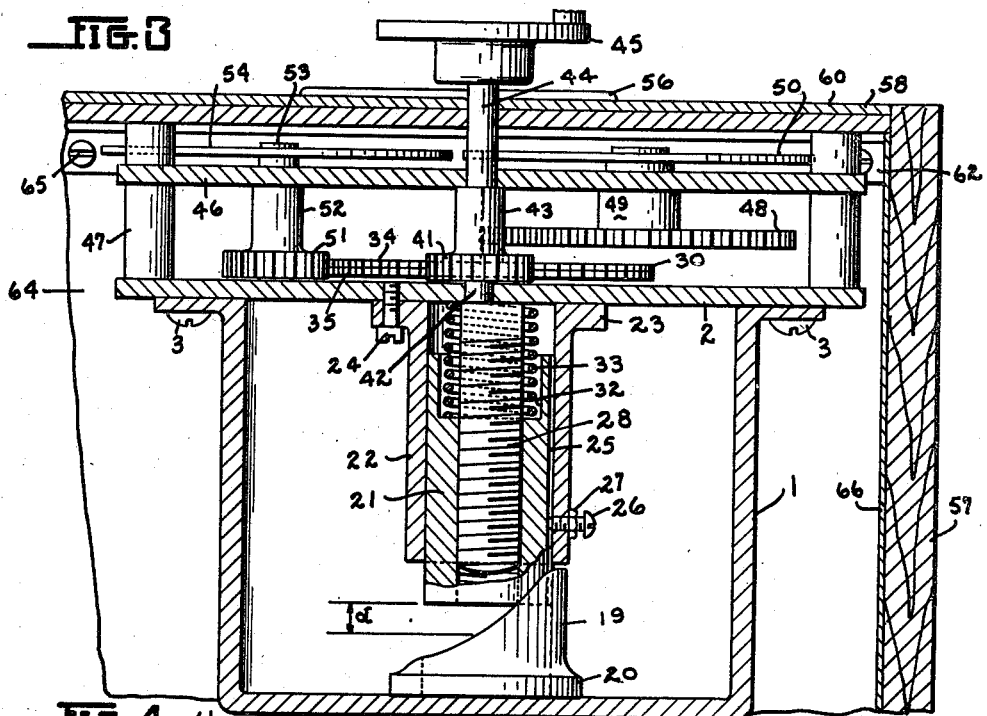
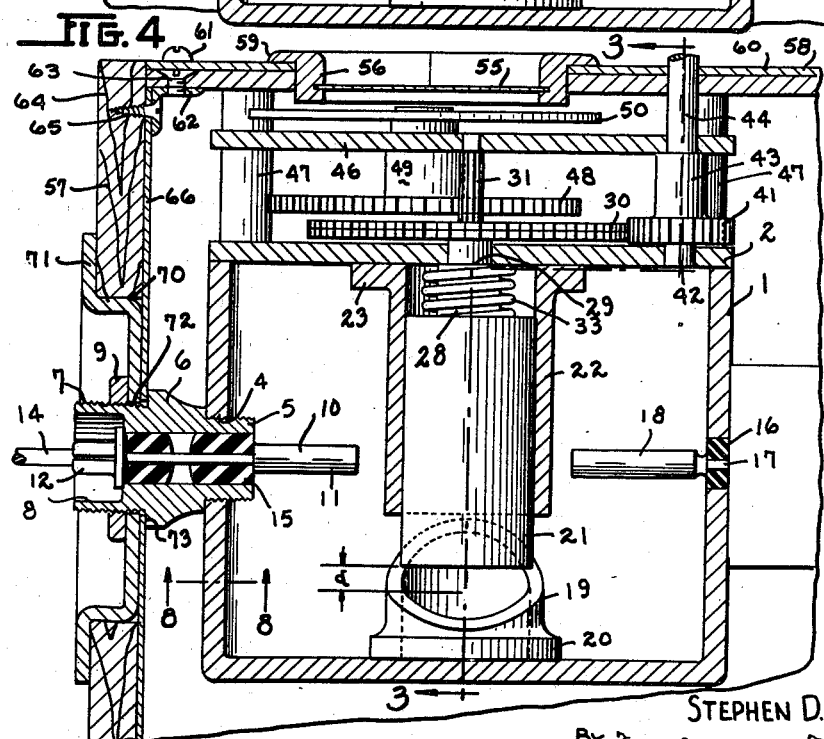
INVENTOR
STEPHEN D. LAVOIE
BY Toulmin & Toulmin
ATTORNEYS

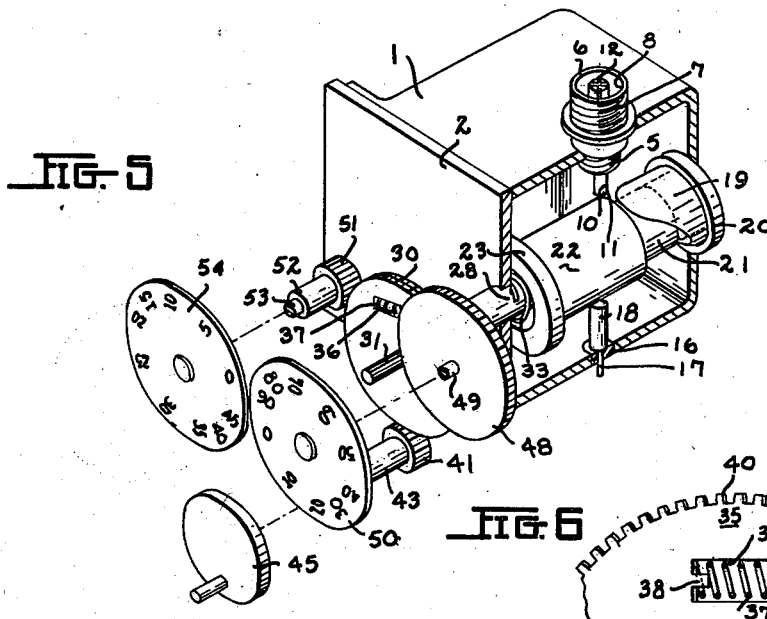
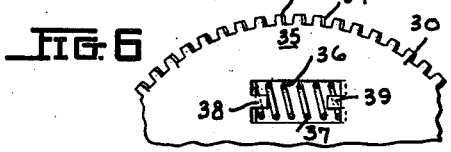
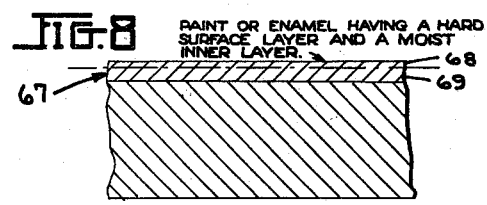
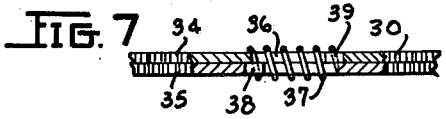
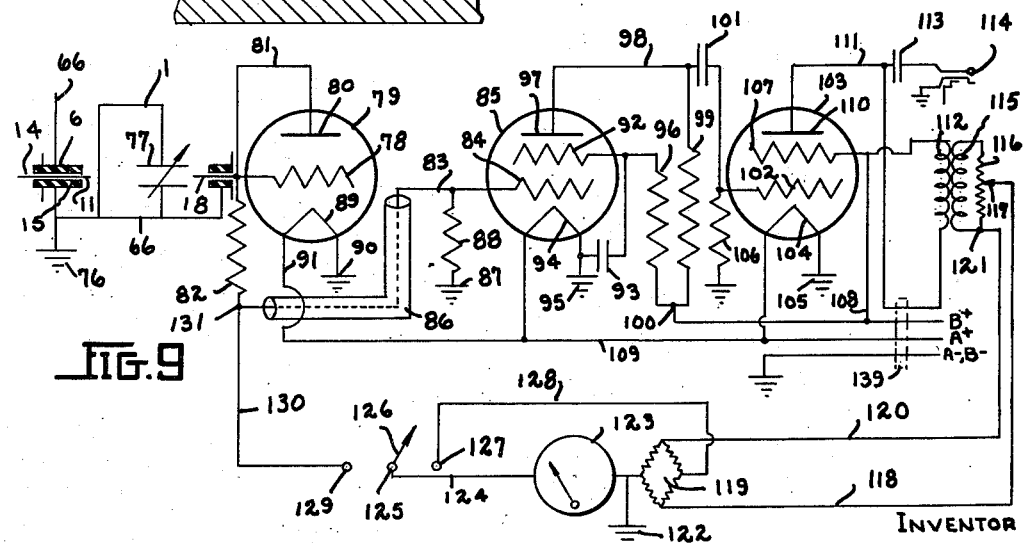

Patented May 23, 1944

REISSUED
JUL 1 1947

2,349,440

UNITED STATES PATENT OFFICE 2,349,440

WAVE METER

Stephen D. Lavoie, Dayton, Ohio

Application September 24, 1941, Serial No. 412,102

13 Claims. (Cl. 250—39)

The present invention relates to wave meters, and more particularly to instruments for measuring the wave length or frequency of ultra-high frequency oscillations generated, for example, by an electronic tube oscillator.

There are, in general, two ways of measuring frequencies or wave lengths if the use of multi-vibrators and other auxiliary apparatus is disregarded. These two methods may be classified as (a) Transmission line type,
(b) Coil and condenser type.

The usual method of measuring the frequency of an oscillator with the transmission line type of wave meter is to couple the line to the oscillator and observe the change in the meter connected in the circuit of the oscillator as the line is shorted through maximum and minimum nodal points. A shorting bar is moved up and down the transmission line, shorting out successively adjacent points on the line. The impedance of the line is reflected back on the oscillator, and as the bar is moved back and forth through the maximum or minimum points the impedance of the oscillator outfit is changed. The meter is ordinarily placed in the grid circuit of the oscillator to indicate grid current which will vary in accordance with the changes in the impedance of the transmission line. This method will measure ultra-high frequencies, but not very accurately, for the reason that the transmission line represents distributed inductance and capacity so that the line responds not only to the basic frequency but also to multiples and sub-multiples thereof. The apparatus does not lend itself to rapid measurement and is large and cumbersome, requiring great care in making the determinations.

The coil and condenser type of wave meter, when designed and employed in the ordinary manner, is limited as to the range of frequency measurement, and in general will give accurate results only up to a few hundred megacycles, because a meter of this type employs an open form of inductance and a condenser of the usual construction. It is apparent that in a construction of this kind considerable leakage of current through the condenser and coil is inevitable, so that a meter of this type is completely unreliable in the ultra-high frequency wave band, for example, between 300 and 700 megacycles.

The improved wave meter, which will be described presently, is of the coil-condenser type referred to above, but the structure has been so completely modified as to increase the frequency range at which highly accurate results are obtained. In the first place, the coil structure, as modified, has little or no resemblance to an ordinary wound coil, although providing the necessary inductive reactance. It has been found that coils of the ordinary type cannot be satisfactorily built at the present time which have a so-called ratio $$Q = \frac{(2\pi f 1)}{R}$$

sufficiently high to provide the requisite sharpness of the frequency resonance curve. Secondly, the necessary inductance is provided without any appreciable distributed capacity, and all of the capacity which controls the resonance frequency of the tuned circuit is lumped into a single element which may be readily and accurately adjusted.

The primary object of the present invention is to provide an accurate, compact and continuously variable wave meter for the ultra-high frequency spectrum.

Another object is to provide an ultra-high frequency wave meter which maintains its accuracy of measurement without further calibration over long periods of time and preferably over the entire operating life of the meter.

A further object is to provide an instrument of the type referred to, which is inexpensive, self-contained, portable, is shielded, and which has the minimum number of operating parts.

Another object is to provide an ultra-high frequency wave meter in which the frequencies to which the meter accurately responds may be readily adjusted over a relatively wide frequency range, and the measurement of frequency can be indicated directly in cycles per second or in wave length.

A still further object is to provide a wave meter which can accurately measure frequencies in a range above 300 megacycles, and the resonant circuits of the meter will not respond to the effects of multiple and sub-multiple frequencies.

In still another aspect the invention comprises an ultra-high frequency meter in which the ratio of reactance to resistance Q is exceedingly high in order to assure a sufficient sharpness of the frequency resonance curve from which the frequency indications are derived.

These objects are attained, in brief, by providing a meter which operates on the coil-condenser principle, employing maximum current indications (as distinguished from null current), and in which the variations in frequency response are obtained by changing the effects of a lumped capacity. The inductance of the resonant circuit is provided without the use of an ordinary type of wound coil so that leakage between turns and also distributed capacity are avoided. The variable lumped capacitance of the improved meter resides between the rugged casing of the meter and the plunger which is given a reciprocatory movement of a positive and resettable character.

Other objects and features will be apparent from a reading of the following specification together with the accompanying drawings.

In the drawings:

Figure 1 is a perspective view of the improved wave meter, which is illustrated as being contained in a box for carrying purposes.

Figure 2 is a section taken along the line 2—2 in Figure 1, and looking in the direction of the arrows.

Figure 3 is a sectional view of the improved meter partly broken away. The section is taken along the line 3—3 in Figure 4.

Figure 4 is a sectional view taken along the line 4—4 in Figure 2, and looking in the direction of the arrows.

Figure 5 is a perspective view of the wave meter unit and associated gearing, the unit being broken away to show the internal parts.

Figure 6 is a fragmentary plan view of the anti-back lash gear forming part of the actuating mechanism.

Figure 7 is a section taken through a portion of the back lash gear to show the mechanism by which the back lash is eliminated.

Figure 8 is a small section taken along the line 8—8 in Figure 4, and showing a slightly modified optional structure.

Figure 9 is a diagrammatic layout of the circuit.

Referring to the drawings, the ultra-high frequency wave meter embodying my invention is entirely housed except for the actuating mechanism within a heavy approximately rectangular metal housing 1 (Figures 3, 4 and 5), preferably a one-piece aluminum casting integrally closed on all sides except one side, and the open side being closed by a heavy metal cover plate 2 secured thereto by means of the screws 3, or in any other suitable manner. The casting 1, also the cover plate 2, has a thickness of not less than $\frac{3}{16}''$ so that the housing is of an extremely rugged character, permitting no bends, warping or other relative displacement between the sides and the cover plate.

One of the sides is provided with a threaded opening 4 which is adapted to receive the screw shank 5 of an input connector 6. This connector takes a general cylindrical shape and terminates at the end remote from the threaded portion 5 in a threaded collar 7, provided with a countersunk bore 8 and adapted to receive a nut 9. The purpose of the nut will be explained presently. The input connector is provided with an axial bore which receives a metal rod 10, extending into a larger stub portion 11 on the interior of the housing 1, and at the opposite end terminates in a metal terminal 12, provided with four quadrantal sections which give a compression effect to a leading-in conductor 14. The rod 10 is insulated from the cylinder 6 by suitable material, for example a plastic 15 of the polystyrene type. Material which is known on the market as "Amphenol" may be used for this purpose. As the opposite side of the housing 1 there is an opening which receives an insulating bushing 16, preferably of a plastic material, this bushing being adapted to receive a leading-out conductor 17 which carries an enlarged stub portion 18. The stub portions 11 and 18 are preferably in line with one another, extending toward the center of the housing, and are in inductive relation with respect to a variable lumped capacity, which will now be described.

The variable condenser is comprised essentially of a hollow cylindrical member 19, the interior of which is machined to dimension, terminating at the bottom (Figures 3 and 4) in a flanged base 20 which is secured in any suitable manner to the lower side of the housing. The upper edge of the cylinder 19 is given a curvilinear shape in order to provide the variations in changes of capacitance when the parts of the condenser are moved with respect to one another. The movable portion of the condenser is constituted of a plunger 21 which is slidably received by a cylinder 22, the latter being flanged at 23 and secured to the cover plate 2 by the screws 24. There is a longitudinal groove 25 provided at one side of the cylinder and a screw 26, carrying a locknut 27, is extended through the cylinder 22 into the groove. The purpose of the groove and the screw is to assure that the plunger 21 has only a reciprocatory movement within the cylinder and positively cannot rotate. The diameter of the plunger 21 is such that when extended it will move into the circular opening formed by the cylinder 19 in a snug fit, but without friction.

It is apparent that the plunger, also its groove 25, and the interior of the cylinder 22 are all machined to dimension and preferably polished. It is desirable to coat the plunger 21, the interior of the cylinder 19 and the two stubs 11, 18 with silver in order to provide a low resistance path for the high frequency energy, in which case the body of these elements may be formed of a higher resistance and cheaper metal, such as brass.

The plunger 21 is given its reciprocatory motion by means of a threaded rod 28, this rod extending practically the entire length of the plunger in order to assure stability of support. For this purpose the plunger 21 is provided with an internal bore which is threaded to receive the threads of the rod 28. The rod is shouldered at its upper end, as indicated at 29, the shouldered portion being journalled in the cover plate 2 and extending outside of the housing to serve as a shaft on which a large anti-back lash driving gear 30 and a pinion 31 are mounted. The plunger 21 is provided at its upper end with a countersunk bore 32 which receives the lower end of a compression spring 33, the latter bearing at its upper end against the under side of the cover plate 2. The purpose of the spring is to apply a constant pressure against the plunger 21 and thereby prevent any lost motion due to continued use.

It is apparent that as the gear 30 is rotated, in a manner which will be described presently, the rod 28 will be likewise rotated, causing the plunger 21 to be moved either upwardly or downwardly depending on the direction in which the gear is rotated, and thus to increase or decrease the distance $d$ between the lower edge of the plunger and the nearest surface of the cylinder 19. The capacity of the wave meter is practically entirely concentrated in the space between the plunger 21 and the cylinder 19 so that variations of capacitance are obtained by moving the plunger with respect to the cylinder. The gear 30 is preferably constructed in such a manner as to eliminate all back lash, and the details of a preferred construction are shown in Figures 6 and 7.

The gear 30 is peripherally split into two sections 34, 35, each section being provided with a rectangular opening 36 which is adapted to receive a compression spring 37. One of the sections, for example 34, is provided with a tab 38 which extends into the opening 36, for example from left to right, as shown in Figure 6. The other section 35 is provided with a similar tab 39 positioned at the opposite side from the tab 38, and also extending into the opening 36. These tabs constitute oppositely positioned pins for locating the ends of the spring 37, the arrangement being such that the compressional effects of the spring serve to slide the gear section 34 with respect to the other section so that the teeth of the respective sections are slightly out of line with one another. It is apparent that any looseness of fit between the teeth 40 and teeth with which the gear meshes will be readily taken up by the relative movement between the gear sections 34, 35. The gear 30 is actuated by a pinion 41 which is journalled at the lower end in the cover plate 2, as indicated at 42, and is provided with a hub 43 at the upper end, the hub portion being extended as a small diameter shaft 44 which is provided with a hand-operated wheel 45. The shoulder between the shaft 44 and the hub 43 abuts a metal plate 46 which is separated from the cover plate 2 by means of the spacers 47. Thus by turning the hand wheel 45 it is possible to cause a reciprocatory motion of the plunger 21 through the pinion 41, anti-back lash gear 30, and the threaded rod 28.

The pinion 31 engages a gear 48 which is suitably journalled in the plate 46, and a shaft 49 is extended from the gear 48, this shaft carrying at its outer end a dial 50. The dial 50 is preferably divided into one hundred parts, of which each tenth division has been indicated on the drawings. The gear 30 is also adapted to mesh with a pinion 51 which is journalled at the hub portion 52 (Figure 3) in the plate 46, this hub portion being extended as a shaft 53 which carries a dial 54, preferably marked off in divisions, zero to 50. The dials 50, 54 are placed side-by-side in the same plane and quite close together so that the indications of the inner portions of the dials may be simultaneously read through a glass window 55, secured in a rubber gasket 56 (Figure 4).

A consideration of the gearing in Figure 5 will show that as the hand wheel 45 is rotated the pinion 41 will drive the gear 30 at a step-down speed, and assuming that the number of teeth on the pinions 41 and 51 is equal, the gear 30 will cause the pinion 51 to rotate at the same speed as the pinion 41 and the hand wheel 45. Thus the dial 54 will turn at the same rate as the hand wheel 45. However, the pinion 31, which has the same speed of rotation as the gear 30, drives the gear 48 at a relatively slow speed and the ratio between the number of teeth on the pinion and the gear is such that the dial 50, which is operated by the gear 48, is rotated at one-fiftieth the speed of the dial 54. Thus the gearing is such as to cause the number dial 50 to rotate fifty times slower than the counter dial 54 for a given type of device, and the construction of the gear 30 is such as to prevent any back lash between this gear and either of its pinions 41, 51. When the hand wheel 45 is rotated the plunger 21 is reciprocated at a rate depending on the speed of rotation of the hand wheel and its direction of rotation, and the movements of the hand wheel are translated into exact reciprocatory movements at the plunger 21. The indications at both dials may be readily seen through the window 55.

All of the parts of the wave meter described hereinbefore, including the gearing and with the exception of the wheel 45, are contained in a wooden case 57, preferably of oak and varnished on its exterior surface. The wooden case is extended about the four sides and the bottom but with the top open to receive a panel 58 of a suitable insulating material such as hard rubber, Bakelite, etc. The gasket 56 is preferably provided with a flange 59, which extends over and bears against the outer surface of the panel 58. This panel is held in place on a metal plate 60 by means of machine screws 61. The sides of the box which form the outer casing are held together by means of small angle iron pieces 62, one of which is shown at the upper left-hand corner in Figure 4 as being secured to the metal plate 60 by a screw 63. The other leg of the angle iron member is fastened to the wooden side 64 by a wood screw 65. There is a layer of copper 66 extending over the inner surfaces of the wooden sides, the corner portions of each copper plate being inserted between the angle iron 62 and the wooden side, thus being maintained rigidly in position. The purpose of the copper layer or sheet is electrically to shield the internal parts of the casing from any external fields, magnetic or electrostatic, so that the changes in electrical characteristics brought about by the movement of the plunger 21 are entirely free from deleterious effects.

In addition to the use of a copper plate for shielding purposes, still another shield may be optionally employed about the aluminum casting within the wooden casing. As shown in Figure 8, the casting may be coated with paint or enamel of any suitable and well known type, which dries with a hard exterior surface but leaves a wet layer next to the aluminum casting. The purpose of the wet layer is to provide a conducting path of relatively high resistance around the aluminum casting between the input and output terminals, so that any leakage high frequency currents which tend to pass directly between the input terminal 6 and the output terminal 17 around the metal casting will be dissipated as heat in the resistance path formed by the interior layer of the paint or enamel. In Figure 8 the paint or enamel layer has been generally designated 67, of which the hard exterior layer is indicated at 68 and the wet interior layer at 69, these layers being separated by a dot and dash line.

The wooden side 64 nearest the input terminal 6 is provided with an opening 70 which receives a circular cup-shaped member 71, made preferably of brass or aluminum, the member being provided with a flange which bears against the outer surface of the wooden plate, as shown in Figure 4. The bottom of the cup-shaped member is provided with an opening 72 which is sufficiently large to snugly receive the threaded collar 7. The purpose of the member 71 is to direct deleterious fields away from the input electrode 12 by reflection. The terminal 6 is provided with a shoulder 73, upon which the copper plate 66 and the bottom portion of the member 71 rest. The nut 9 presses the copper plate 66 and the member 71 tightly against the shoulder 73. The clamping effect exerted by the nut 9 closes all of the crevices or cracks at this point through which otherwise ultra-high frequency currents may leak. The arrangement is such that all of the high frequency currents brought to the input terminal by the conductor 14 pass without the slightest leakage through the conducting rod 10, to the input stub 11. A handle 74 may be secured by the clips 75, which are screwed to one of the wooden sides of the casing for convenience in transporting the instrument.

The circuit for the improved instrument is shown in Figure 9, and for clearness the various elements of the instrument are indicated by single lines. Thus the copper layer 66 is shown as a vertical and horizontal line, grounded at 76, and the input terminal 6 which contains the input stub 11 is shown as passing through the copper layer. The aluminum casting 1 is diagrammatically indicated as a rectangle, and the capacitance or condenser effect existing between the lower end of the plunger 21 and the cylinder 19 is represented by a variable condenser 77. The output stub is designated 18, as in Figure 4, this stub being carried through the conductor 17 to the grid 78 of a diode detector tube 79. The plate 80 of the tube is connected to the grid through a conductor 81, and these two electrodes are connected through a resistor 82, by a conductor 83, to the control grid 84 of a high gain amplifier tube 85. The conductor 83 is preferably shielded throughout its length by a copper braid 86, and the conductor is grounded as at 87 through a resistor 88. The cathode of the tube 79 comprises a filament 89, one leg of which is grounded as indicated at 90, the other leg 91 being connected to a corresponding filament terminal of the cascade-connected amplifier tubes. The auxiliary grid 92 of the tube 85 is connected through a fixed condenser 93 to one leg of the filamentary cathode 94, this leg being grounded as indicated at 95. There is also a resistance connection indicated at 96 between the grid 92 and the B+ terminal of a battery, which preferably is of the dry cell type. The anode 97 of the tube 85 is connected through a conductor 98 and a resistor 99 to the B+ side of the battery, the lower terminals of the resistors 96 and 99 being connected together as indicated at 100.

The amplifier 85 is capacitively coupled through a condenser 101 to the control grid 102 of a second high gain amplifier 103. The filamentary cathode is indicated at 104, having one leg grounded at 105. The control grid 102 is also grounded through a resistor 106. The auxiliary grid 107 is connected through a conductor 108 to the B+ side of the high potential battery. It will be noted that one leg of the cathodes 89, 94 and 104 is connected through a common conductor 109 to the A+ side of a relatively high current dry cell battery. The plate 110 of the last amplifier tube 103 is connected through a conductor 111 to one end of a transformer primary 112, the other terminal of which is connected to the B+ side of the battery. A direct current blocking condenser 113 is inserted in an extension of the line 111, and a telephone jack 114 of any suitable and well known type is connected to the extension line, as indicated. The secondary 115 of the output transformer is shunted by an adjustable high resistance 116 provided with a movable tap 117. This tap is connected through a conductor 118 to one corner of a resistance bridge circuit shown at 119, the opposite corner of which is connected through a conductor 120 to the lower terminal 121 of the transformer secondary. One of the intermediate terminals of the bridge circuit is grounded at 122 and is also connected to a zero-to-200 microampere scale ammeter 123. The other terminal of the meter is connected through a conductor 124 to an intermediate terminal on a double-throw switch 125, the blade of which is indicated at 126. The right-hand terminal 127 of the double-throw switch is connected through a conductor 128 to the remaining intermediate corner of the bridge 119, and the left-hand terminal 129 is connected through a conductor 130 to the junction 131 of the resistor 82 and the conductor 83.

*Operation of the instrument and circuit*

Assume that the source of unknown ultra-high frequency is connected to the conductor 14. These high frequency currents will pass to the input stub 11 and will induce currents in the aluminum casting, also in the plunger 21 and its associated cylinder 19, these currents being vectorially 180° apart to constitute inductive and capacitative components. The inductive reactive component is of minor importance since the control of the resonance of the circuit is vested almost entirely in the capacitative effect which is exercised between the lower surface of the plunger 21 and the upper or nearer surface of the cylinder 19. After passing through the resonance chamber comprising the aluminum casting, and the variable loaded capacity constituted of the plunger 21 and the cylinder 19, the high frequency currents induce corresponding currents in the output stub 18 and are applied to the combined grid and plate of the detector tube 79. At this point the oscillations are rectified and the direct current components are successively amplified by the tubes 85, 103. The output of the last amplifier stage may be indicated at the telephone jack 114 but it is preferred to pass the output currents through the transformer to the bridge 119. When the switch blade 126 makes contact with the terminal 127 amplified currents are passed through the bridge to the microammeter 123. When the blade 126 makes contact with the terminal 129, the ammeter 123 will be connected directly to the detector 79, in which case the direct current components are not amplified but are received directly by the meter.

For making the test for frequency, assume that the apparatus as a whole has been properly calibrated. The hand wheel 45 is rotated to cause the plunger 21 to recede from or approach the cylinder 19 until a maximum reading is observed at the microammeter 123. It is obvious that under these conditions the movement of the plunger 21 places the resonance chamber 1 in tune with the ultra-high frequency currents, and the exact vertical position of the plunger 21 by which this result is accomplished may be read directly as frequency or wave length by the two dials 50, 54. The dial 54 may be considered as giving a unit reading between the multiple indications of the dial 50. The reading of both dials may be observed through the single glass window 55 which is mounted on the face of the instrument, as shown in Figure 1. The meter 123 is mounted on the top cover of the casing, and in addition to the two indicators and the hand wheel there is a telephone jack 114 and an on-and-off switch 132 connected in the filament conductor 109, also a knob 133 for varying the resistance 116, and finally a knob 134 which is connected to the switch blade 126.

It is apparent that the face of the instrument contains only the minimum amount of apparatus, including the adjustment devices, so that the operation of the instrument as a whole is fairly simple. The casing 57 is sufficiently large to contain all of the necessary batteries, which are preferably of the dry cell type to increase their portability. The compactness of the instrument is clearly shown in Figure 2. The batteries are conveniently placed in one corner of the casing, and the transformer contained in a shielded case 135 is secured to and well insulated from the top cover 60 of the casing. The variable resistor 116 and the switch 125 are also conveniently mounted on the top cover, and the latter in addition supports the resonance chamber 1. It is preferred to mount the detector 79 and the amplifiers 85, 103 on different sides of the resonance chamber. In Figure 2 the detector is shown as being contained in a metal casing 136 secured to the front side of the chamber 1, while the two amplifiers 85, 103 are contained in a metal casing 137 on a different side of the container. All of the battery leads, indicated at 138, are taken from their respective batteries through heavily insulated cables to a removable adapter 139, which has prongs (not shown) making contact with sockets contained in a base member 140 secured to the amplifier casing. It is apparent that by moving the adapter 139 all battery connections are broken at the base 140.

From the foregoing it is evident that I have disclosed an improved wave meter which is adapted to measure either the frequency or wave length of high frequency oscillations which may be generated, for example, in a high frequency tube oscillator. The connections between the conductor 14 and the oscillator may be made in any suitable and well known manner, such as by means of a loop dipole, capacity or a direct connection. Radiation from the stub 11 sets up a standing wave system in the resonator when the tuning adjustment exercised at the wheel 45 and carried through the plunger 21 and the cylinder 19 is in tune. The chamber 1 may be considered as a variable impedance and having a high impedance at frequencies other than the resonance frequencies. It is apparent that the free end of the plunger 21 and the cylinder 19 may be shaped to present to each other an increment of area variable in accordance with any predetermined function as the portions are moved relatively. For example, assuming that the lower end of the plunger 21 is flat, the cylinder 19 could be given a contour at the edge which would cause a straight-line function between the instantaneous position of the plunger 21 and either frequency or wave length of the currents to which the chamber has been attuned. Thus the meter 123 may be calibrated in either frequency or wave length, depending on the shape of the edge surface at the cylinder 19.

It will be further noted that, due to the complete absence of back lash at the gear formed of the sections 34, 35 and the compression effect exercised at the spring 33, a direct and positive relation is established between the instantaneous positions of the plunger 21 and the indications of that position shown by the dials 50, 54. Thus the improved instrument has a high degree of resettability so that the wave meter could be used for many years and still operate according to the calibration curve which had been determined by the manufacturer. This consideration is very important in connection with meters which measure ultra-high frequency such as in the range of 300 to 700 megacycles.

The concentric arrangement of the plunger 21 and the cylinder 19 is such that a movement of the plunger affects solely the capacitative element of the resonant circuit because the mutual inductance between the central cylindrical portion 22 and the outer casting 1 remains substantially constant regardless of the position of the plunger. Consequently, the movements of the plunger 21 introduce only a capacitative change in the characteristics of the resonant circuit, and this capacitance is loaded at one general point free from any deleterious magnetic or electrostatic effects and controllable solely by the operation of the hand wheel 46.

While I have described the improved instrument as being adapted to measure the frequency or wave length of ultra-high frequency oscillations, it will be understood that the instrument, if desired, may be designed to measure frequencies in the lower frequency ranges. Proper choice of the pitch of the threaded control shaft 28, size of the gears 30, 41, 48, 51, dimensions of the chamber 1 and cover plate 2 of the variable capacity elements 21, 19 and the shape of the curve of the cylindrical element 19 and the movement of the variable capacity plunger 21 may all be so designed that the range of frequencies over which the instrument will accurately respond may be considerably changed. However, the improved instrument has an important advantage over other instruments, particularly in the ultra-high frequency range, of responding to only one frequency as determined by the maximum reading at the meter 123, and positively will not respond to any harmonic or sub-multiple frequency, as is the case in instruments operable on the Lecher wire principle. The instrument operates on the principle of maximum current reading rather than null current reading, and thus introduces additional accuracy into the determinations.

It will be understood that I desire to comprehend within my invention such modifications as come within the scope of the claims and the invention.

Having thus fully described my invention, what I claim as new and desire to secure by Letters Patent, is:

1. A wave meter for measuring ultra-high frequencies comprising an electrically resonant chamber including a closed metal container, a first metal portion secured to and projecting inwardly from one wall of said container, a second metal portion secured to and projecting inwardly from the wall approximately opposite said first metal portion to form an electrical capacity therebetween, the free ends of said metal portions being shaped to present to each other an increment of area variable in accordance with a predetermined function as said portions are moved relatively, means for changing the resonance frequency of the resonant circuit thus formed by said container and said portions comprising means for moving the free ends of said portions relatively toward and away from one another, and coupling means positioned within said container for applying unknown frequencies to the resonant chamber and for withdrawing the oscillations from the resonant chamber for measuring purposes, said coupling means including input and output electrodes of rod-like configuration and arranged coaxially in line with one another on opposite sides of said metal portions.

2. A wave meter comprising an ultra-high frequency resonant circuit including, in combination, a closed metal container, a tubular metal member secured to and projecting inwardly from one wall of said container, a cylindrical metal member secured to and projecting inwardly from the approximately opposite wall of said container and concentric with said tubular member to form therewith an electrical capacity, the extended end of one of said members being shaped to present a variable increment of area to the other of said members in accordance with a predetermined function as one is moved toward the other, means for changing the resonance frequency of the resonant circuit thus formed by said container and said members comprising means for moving the free end of one of said members toward and away from the other of said members, means including an input electrode for applying oscillations of unknown frequency to said resonant circuit, and means including an output electrode for withdrawing oscillations from said circuit and applying the withdrawal oscillations to a frequency indicating device, said input and output electrodes being presented endwise and in coaxial alignment to the opposite sides of said tubular and cylindrical members.

3. A wave meter comprising an ultra-high frequency resonant circuit formed of a closed metal container, a tubular metal member secured to and projecting inwardly from one wall of said container, a first cylindrical metal member secured to and projecting inwardly from the approximately opposite wall of said container and concentric with said tubular member to form therewith an electrical capacity, a second cylindrical metal member secured to one of said other members and concentric therewith to form with the other of said members a fixed lumped electrical capacity, the extended ends of said two first-mentioned members being shaped to present to each other an increment of area variable in accordance with a predetermined function as they are moved relatively, means for changing the resonance frequency of the resonant circuit thus formed by said container and said members comprising means for moving the free ends of said members relatively toward and away from each other, means comprising an input stub electrode which passes through said metal container for applying oscillations of unknown frequency to said resonant circuit, means comprising an output stub for withdrawing oscillations from said resonant circuit, and means for measuring the withdrawn current in terms of frequency.

4. A wave meter comprising an ultra-high frequency resonant circuit formed of a closed metal container, a tubular metal member secured to and projecting inwardly from one wall of said container, a first cylindrical metal member secured to and projecting inwardly from the approximately opposite wall of said container and concentric with said tubular member to form therewith an electrical capacity, a second cylindrical metal member secured to one of said other members and concentric therewith to form with the other of said members a fixed lumped electrical capacity, the extended ends of said two first-mentioned members being shaped to present to each other an increment of area variable in accordance with a predetermined function as they are moved relatively, means for changing the resonance frequency of the resonant circuit thus formed by said container and said members comprising means for moving the free ends of said members relatively toward and away from each other, means comprising an input stub electrode which passes through said metal container for applying oscillations of unknown frequency to said resonant circuit, means comprising an output stub for withdrawing oscillations from said resonant circuit, and means for measuring the withdrawn current in terms of frequency, said last-mentioned means comprising a rectifier and an amplifier together with an ammeter calibrated in frequency in the output circuit of the amplifier.

5. A wave meter comprising an ultra-high frequency resonant circuit formed of a closed metal container, a tubular metal member secured to and projecting inwardly from one wall of said container, a cylindrical metal member secured to and projecting inwardly from the approximately opposite wall of said container and concentric with said tubular member to form therewith an electrical capacity, the extended end of one of said members being shaped to terminate in a plane oblique to the common axis of said members, means for changing the resonance frequency of the resonant circuit thus formed by said container and said members comprising means for moving the free end of one of said members toward and away from the other of said members, and coupling means positioned within said container for connecting said resonant circuit to a source of unknown frequency and also to a frequency determining apparatus, said coupling means including input and output electrodes of rod-like configuration and arranged in rectilinear relation on opposite sides of said members.

6. A wave meter comprising an ultra-high frequency resonant circuit formed of the following elements in combination: a closed metal container, a tubular metal member secured to and projecting inwardly from one wall of said container, a cylindrical metal member secured to the approximately opposite wall concentrically with said tubular member and projecting into but out of physical contact therewith to form an electrical capacity therebetween, means for changing the resonance frequency of the resonant circuit thus formed by said container and said concentric members comprising mechanical means relatively moving said members to move said cylindrical member into and out of said tubular member, and means including stub electrodes which extend from opposite sides of the container in coaxial alignment and are directed toward but spaced from said cylindrical metal member for applying oscillations of unknown frequency to the resonant circuit and for withdrawing oscillations from the resonant circuit to be measured by a frequency indicating apparatus.

7. A wave meter comprising an ultra-high frequency resonant circuit formed of the following elements, in combination: a closed metal container, a tubular metal member secured to and projecting inwardly from one wall of said container, a cylindrical metal member secured to the approximately opposite wall concentric with said tubular member and projecting into but out of physical contact therewith to form an electrical capacity therebetween, a threaded shaft meshed into a threaded hole along the longitudinal axis of said cylindrical member, control means accessible from the exterior of said container for rotating said shaft to move said cylindrical member into and out of said tubular member to vary the resonance frequency of the resonator formed by said container and said concentric members, means including an input electrode for applying to said resonant circuit oscillations of unknown frequency, and means including an output electrode for withdrawing oscillations from said circuit and applying the withdrawn oscillations to a frequency determining apparatus, said electrodes being presented coaxially in line with one another to said metal members from opposite sides of the container.

8. In a self-shielded ultra-high frequency wave meter, in combination, a closed metal housing and a resonant circuit contained within the housing, said housing forming part of the resonant circuit, means for adjusting the resonance of said circuit, means including an input electrode for applying to said circuit frequencies to be measured, and means including an output electrode for withdrawing oscillations from said circuit and for applying the withdrawn oscillations to frequency indicating apparatus, said electrodes being presented to said resonant circuit coaxially in line with one another from opposite sides of the housing.

9. In combination, an ultra-high frequency wave meter comprising a metal housing completely surrounding an adjustable condenser, said housing forming with said condenser a resonant circuit, means including an input electrode for applying oscillations of unknown frequency to the resonant circuit, and means including an output electrode for withdrawing oscillations from the circuit and applying the same to frequency indicating apparatus, said electrodes being presented to said resonant circuit coaxially in line with one another from opposite sides of the housing said housing acting as a complete shield for the resonant circuit of which it forms a part.

10. A wave meter comprising a casing containing a circuit resonant to the frequency to be measured, said circuit including an inductance and a lumped variable capacity, input and output leads for said circuit, said input lead being connected to the source of unknown frequency and the output lead being connected to frequency measuring apparatus, said lumped capacity comprising movable and stationary metal elements, one element extending from one side of the casing and the other element extending from the opposite side, the electrical interaction of said elements and the casing constituting the inductance portion of the resonant circuit, said input and output leads extending coaxially in line with one another into said casing from opposite sides of said movable and stationary elements.

11. A wave meter comprising an ultra-high frequency resonant circuit, said circuit including a metal container, a first metal portion secured to and projecting inwardly from one wall of said container, a second metal portion secured to and projecting inwardly from the wall approximately opposite said first metal portion to form an electrical capacity therebetween, the electrical interaction of said metal portions and the casing constituting the inductance of the resonant circuit, and means for connecting one end of said circuit to a source of unknown frequency and the other end to a frequency indicating device, said connecting means comprising coaxially aligned input and output metal stubs arranged in spaced inductive relation with respect to said portions, and a metal reflecting plate positioned immediately adjacent the input stub and disconnected therefrom for directing deleterious fields away from said input stub.

12. A wave meter comprising, in combination, a closed metal container, a first metal portion secured to one wall of said container and having a free end projecting inwardly therefrom, a second metal portion secured to the wall approximately opposite said first metal portion to form an electrical capacity therebetween and having a free end projecting inwardly therefrom, means for changing the resonance frequency of the resonant circuit thus formed by said container and said portions comprising means for moving the free ends of said portions relatively toward and away from one another, a stub input electrode for applying to the container and metal portions an alternating current voltage of unknown frequency and an output stub electrode for withdrawing from the container and metal portions output current which is supplied to frequency indicating apparatus, and a plate electrode positioned in the region of the input electrode and electrically insulated therefrom for reflecting undesired oscillations away from the input electrode.

13. A wave meter comprising, in combination, a closed metal container, a first metal portion secured to one wall of said container and having a free end projecting inwardly therefrom, a second metal portion secured to the wall approximately opposite said first metal portion to form an electrical capacity therebetween and having a free end projecting inwardly therefrom, means for changing the resonance frequency of the resonant circuit thus formed by said container and said portions comprising means for moving the free ends of said portions relatively toward and away from one another, a stub input electrode for applying to the container and metal portions an alternating current voltage of unknown frequency and an output stub electrode for withdrawing from the container and metal portions output current which is supplied to frequency indicating apparatus, a wooden casing surrounding said metal container and metal portions, and a metal plate electrode positioned adjacent said input stub electrode and electrically insulated therefrom for reflecting undesired oscillations from the input electrode, said plate electrode being fitted within a depression formed in the wooden casing.

STEPHEN D. LAVOIE.